(12) United States Patent
Park et al.

(10) Patent No.: US 12,620,321 B1
(45) Date of Patent: May 5, 2026

(54) SYSTEMS AND METHODS FOR AUTOMATED FINE-GRAINED SPEECH SCORING

(71) Applicant: Educational Testing Service, Princeton, NJ (US)

(72) Inventors: Seongjin Park, Tucson, AZ (US); Rutuja Ubale, Mountain View, CA (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 18/802,250

(22) Filed: Aug. 13, 2024

Related U.S. Application Data

(60) Provisional application No. 63/519,633, filed on Aug. 15, 2023.

(51) Int. Cl.
| | |
|---|---|
| *G09B 5/02* | (2006.01) |
| *G10L 15/02* | (2006.01) |
| *G10L 15/16* | (2006.01) |
| *G10L 15/22* | (2006.01) |

(52) U.S. Cl.
CPC ................ *G09B 5/02* (2013.01); *G10L 15/02* (2013.01); *G10L 15/16* (2013.01); *G10L 15/22* (2013.01); *G10L 2015/225* (2013.01)

(58) Field of Classification Search
CPC ........... G09B 5/02; G10L 15/02; G10L 15/16; G10L 15/22
See application file for complete search history.

(56) References Cited

PUBLICATIONS

Flege, J.E. et al.; Amount of Native-Language (L1) Use Affects the Pronunciation of an L2; Journal of Phonetics, 25 (2); pp. 169-186; Apr. 1997.
Arabski, Janusz; Language Transfer in Language Learning and Language Contact; Ch. 2 in Language Transfer: Cross-Linguistic Influences in the Second Language Lexicon; Multilingual Matters Ltd.: Clevedon, UK; 2006.
Chalhoub-Deville, Micheline, Wigglesworth, Gillian; Rater Judgment and English Language Speaking Proficiency; World Englishes, 24(3); pp. 383-391; Aug. 2005.
Thomas, Michael et al.; Contemporary Computer-Assisted Language Learning: The Role of Media and Incremental Change; pp. 1-12; Bloomsbury; 2013.
Franco, Horacio et al.; Automatic Detection of Phone-Level Mispronunciation for Language Learning; Proceedings of the 6th European Conference on Speech Communication and Technology, Eurospeech 99; 1999.

(Continued)

*Primary Examiner* — Kesha Frisby
(74) *Attorney, Agent, or Firm* — Jones Day

(57) ABSTRACT

A speech in response to a prompt is accessed. The speech is provided to a speech recognition module that is configured to generate a text transcript of the speech. Speech features are extracted from the speech. Similarly, text features are extracted from the text transcript. Both speech features and text features are vector representations of the speech. The two features are concatenated into one vector representation that captures both perceptual and linguistic components of the speech. The concatenated vector is provided to a speech scoring model. The speech scoring model simultaneously provides a holistic score as well as fine-grained scores to the speech based on the concatenated features.

21 Claims, 8 Drawing Sheets

(56) References Cited

PUBLICATIONS

Deville, G. et al.; Automatic Detection and Correction of Pronunciation Errors for Foreign Language Learners : The Demosthenes Application; Proceedings of the European Conference on Speech Communication and Technology; pp. 843-846; Sep. 1999.

Cheng, Jian, Chen, Xin, Metallinou, Angeliki; Deep Neural Network Acoustic Models for Spoken Assessment Applications; Speech Communication, 73; pp. 14-27; Oct. 2015.

Chen, Lei, Tao, Jidong, Ghaffarzadegan, Shabnam, Qian, Yao; End-to-End Neural Network Based Automated Speech Scoring; IEEE International Conference on Acoustics, Speech and Signal Processing; pp. 6234-6238; Apr. 2018.

Oh, Yoo Ree, et al.; A Deep-Learning Based Native-Language Classification by Using a Latent Semantic Analysis for the NLI Shared Task 2017; Proceedings of the 12th Workshop on Innovative Use of NLP for Building Educational Applications; Copenhagen, Denmark; pp. 413-422; Sep. 2017.

Tao, Jidong, Ghaffarzadegan, Shabnam, Chen, Lei, Zechner, Klaus; Exploring Deep Learning Architecture for Automatically Grading Non-Native Spontaneous Speech; Proceedings of IEEE ICASSP; pp. 6140-6144; 2016.

Park, Seongjin, Culnan, John; Automatic Perceptual Judgment Using Neural Networks; Abstract, in Proceedings of the 178th Meeting of Acoustical Society of America; p. 2957; Oct. 2019.

Park, Seongjin, Culnan, John; Automatic Proficiency Judgments: Accentedness, Fluency, and Comprehensibility; Abstract, in Proceedings of the 181st Meeting of Acoustical Society of America; p. 357; Oct. 2021.

Baevski, Alexei et al.; wav2vec 2.0: A Framework of Self-Supervised Learning of Speech Representations; Proceedings of the 34th International Confernece on Neural Information Processing System; Vancouver, Canada; pp. 12449-12460; 2020.

Qian, Yao et al.; Neural Approaches to Automated Speech Scoring of Monologue and Dialogue Responses; IEEE International Conference on Acoustics, Speech and Signal Processing (ICASSP); Brighton, UK; pp. 8112-8116; May 2019.

Kim, Eesung et al.; Automatic Pronunciation Assessment Using Self-Supervised Speech Representation Learning; Proceedings of Interspeech; pp. 1411-1415; 2022.

Hsu, Wei-Ning et al.; HuBERT: Self-Supervised Speech Representation Learning by Masked Prediction of Hidden Units; IEEE/ACM Transactions on Audio, Speech and Language Processing, 29; pp. 3451-3460; 2021.

Povey, Daniel, Ghoshal, Arnab, Boulianne, Gilles, Burget, Lukas, Glembek, Ondrej, Goel, Nagendra, Hannemann, Mirko, Motlicek, Petr, Qian, Yanmin, Schwarz, Petr, Silovsky, Jan, Stemmer, Georg, Vesely, Karel; The Kaldi Speech Recognition Toolkit; Proceedings of the ASRU Workshop; 2011.

Radford, Alec et al.; Robust Speech Recognition via Large-Scale Weak Supervision; arXiv:2212.04356; Dec. 2022.

Devlin, Jacob; Chang, Ming-Wei, Lee, Kenton, Toutanova, Kristina; Bert: Pre-Training of Deep Bidirectional Transformers for Language Understanding; Proceedings of the Conference of the North American Chapter of the Association for Computational Linguistics: Human Language Technologies, vol. 1; Minneapolis, MN; pp. 4171-4186; Jun. 2019.

Keras: The Python Deep Learning Library; Keras Documentation; http://keras.io.

Wolf, Thomas, et al.; Transformers: State-of-th-Art Natural Language Processing; Proceedings of the 2020 Conference on Empirical Methods in Natural Language Processing: System Demonstrations; pp. 38-45; Oct. 2020.

Kingma, Diederik, BA, Jimmy Lei; Adam: A Method for Stochastic Optimization; ICLR; 2015.

Shah, Jui et al.; What Do Audio Transformers Hear? Probing Their Representations For Language Delivery & Structure; IEEE International Conference on Data Mining Workshops (ICDMW); Orlando, FL; pp. 910-925; Nov.-Dec. 2022.

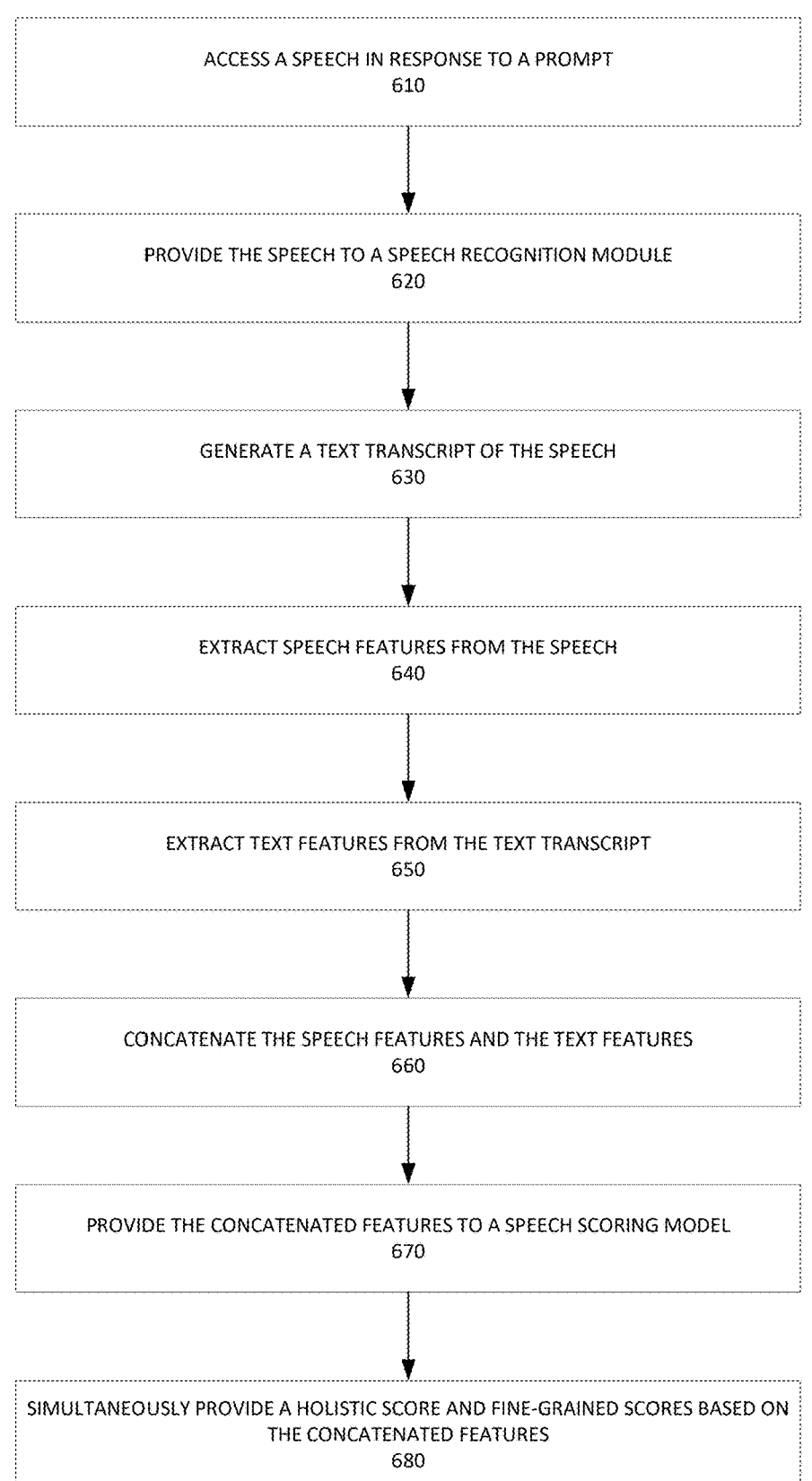

ACCESS A SPEECH IN RESPONSE TO A PROMPT
610

PROVIDE THE SPEECH TO A SPEECH RECOGNITION MODULE
620

GENERATE A TEXT TRANSCRIPT OF THE SPEECH
630

EXTRACT SPEECH FEATURES FROM THE SPEECH
640

EXTRACT TEXT FEATURES FROM THE TEXT TRANSCRIPT
650

CONCATENATE THE SPEECH FEATURES AND THE TEXT FEATURES
660

PROVIDE THE CONCATENATED FEATURES TO A SPEECH SCORING MODEL
670

SIMULTANEOUSLY PROVIDE A HOLISTIC SCORE AND FINE-GRAINED SCORES BASED ON
THE CONCATENATED FEATURES
680

779 Keyboard

781 Microphone

780 Display

788 Interface

754 CPU

787 Display Interface

752

790 Disk Controller

758 ROM

759 RAM

782 Communication Ports

784 CD ROM

785 Hard Drive

783 Floppy Drive

SYSTEMS AND METHODS FOR AUTOMATED FINE-GRAINED SPEECH SCORING

RELATED APPLICATION

This application claims priority to U.S. Provisional Application No. 63/519,633, filed on Aug. 15, 2023, the entirety of which is incorporated by reference herein.

TECHNICAL FIELD

The subject matter described herein relates to speech scoring, and more particularly to automated speech scoring.

BACKGROUND

Effective communication in any language can be facilitated through proficient speaking skills. Proficient speaking skills allow the speaker to clearly and accurately articulate their ideas. One way to improve proficiency in speaking skills is through detailed feedback. Spoken communication comprises key traits such as delivery, language use, and topic development, that each contribute to the overall quality of the spoken communication. These traits can be individually evaluated to provide granular feedback to the speaker. Such granular feedback helps the speaker identify their strengths and weakness so that they can focus on specific areas of improvement. Therefore, a speech scoring model that can provide fine-grained speech scores identifying specific areas of strengths and weakness can help a speaker improve their speaking skills.

SUMMARY

A speech in response to a prompt is accessed. The speech is provided to a speech recognition module that is configured to generate a text transcript of the speech. Speech features are extracted from the speech. Similarly, text features are extracted from the text transcript. Both speech features and text features are vector representations of the speech. The two features are concatenated into one vector representation that captures both perceptual and linguistic components of the speech. The concatenated vector is provided to a speech scoring model. The speech scoring model simultaneously provides a holistic score as well as fine-grained scores to the speech based on the concatenated features.

DESCRIPTION OF DRAWINGS

FIG. 6 is an exemplary process flow diagram for automated fine-grained speech scoring.

DETAILED DESCRIPTION

Receiving feedback on their speech is one of the primary ways in which a speaker can improve their speaking skills. It is especially helpful when the feedback is granular, rather than when it is a singular, holistic score that represents an assessment of the entire speech. Granular feedback is helpful over a holistic score because it helps the writer identify specific areas of strengths and weaknesses. Speech comprises a plurality of distinct traits that contribute to the overall quality of the speech, so it is helpful to identify with particularity which traits the speaker should focus on improving. For example these traits may include both perceptual and linguistic components such as delivery, language use, and topic development. Especially in the context of learning a new language, receiving feedback on multiple traits can be particularly helpful because the language learner can focus on specific aspects to improve. For example, if the granular feedback indicates that the language learner's speech is lacking proper pronunciation, the language learner can focus on improving their pronunciation instead of focusing on other aspects in which they are already proficient.

Computer-implemented systems and methods as described herein are directed to automated fine-grained speech scoring. In embodiments, the systems and methods herein are configured to evaluate a speech in order to provide a holistic score, as well as fine-grained scores across key traits such as delivery, language use, and topic development. Systems and methods herein take advantage of both text and speech features extracted from a speech, so that the holistic evaluation and fine-grained scores take into consideration both the perceptual and linguistic components of the speech.

Figure 1:
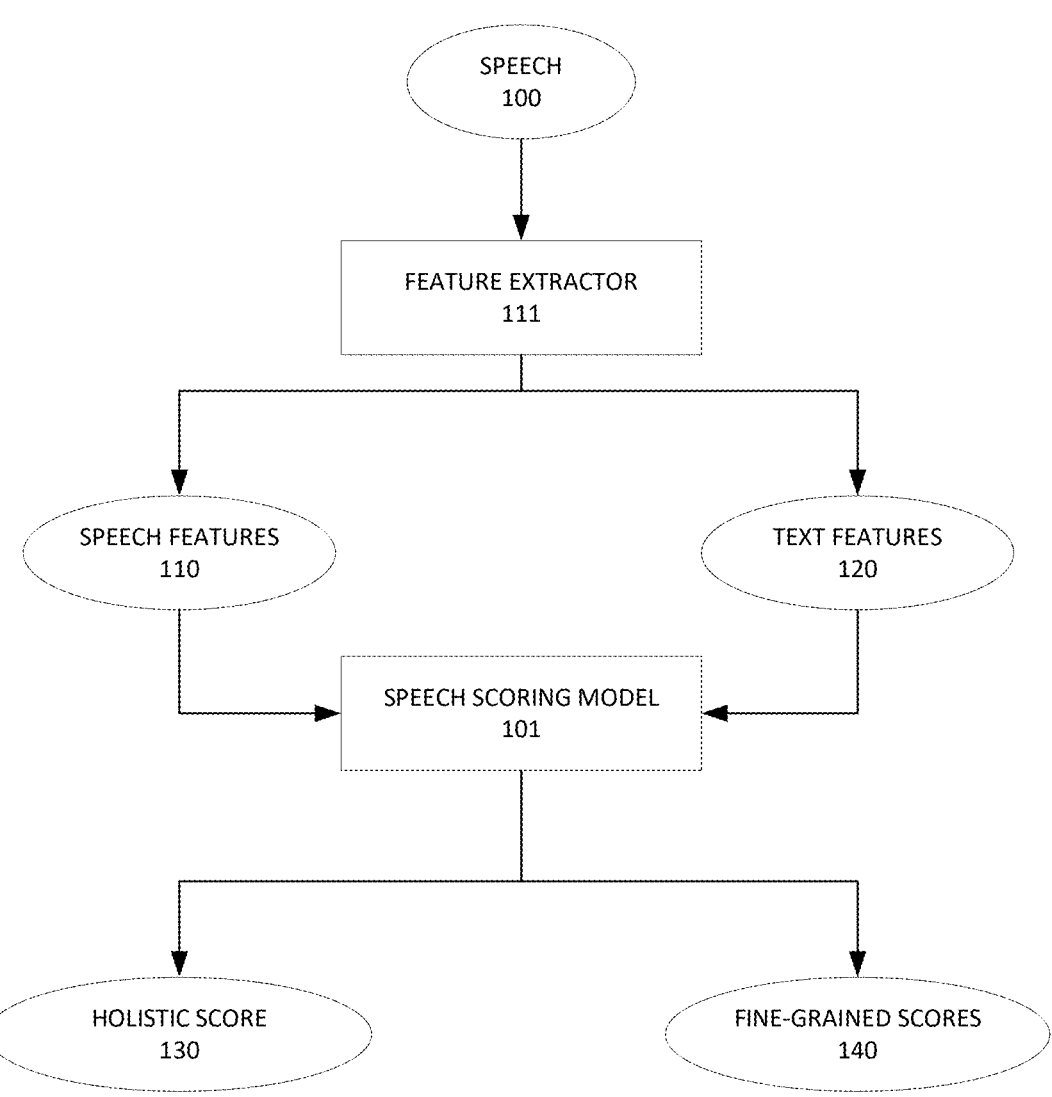
FIG. 1 illustrates an exemplary system for fine-grained speech scoring.

FIG. 1 shows an exemplary system for fine-grained speech scoring. Speech 100 is a verbal response to a prompt. For example, speech 100 may be a language learner's verbal answer to a question on a language assessment test. In another example, speech 100 may be an oral presentation on a given topic. In embodiments, speech 100 may be a raw audio recording of the verbal response in a standard audio format such as WAV. The audio recording digitally represents speech signals, which are air pressure variations created when a speaker produces sound during the speech.

Speech 100 is provided to feature extractor 111, that is configured to receive a speech and extract both speech and text features from the speech. As explained in detail later with respect to FIG. 3, feature extractor 111 outputs speech features 110 and text features 120, both of which are vector representations of speech 100. In an embodiment, speech features 110 captures the perceptual components of the speech, such as pronunciation and intonation. In an embodiment, text features 120 captures the linguistic components of the speech such as semantic and syntactic elements. Speech features 110 and text features 120 are both provided to speech scoring model 101, that is configured to evaluate both features and provide holistic score 130 and fine-grained scores 140 for speech 100. Holistic score 130 is a singular numerical score that represents an evaluation of the entire speech, without providing insights into particular strengths and weaknesses of the speech. Fine-grained scores 140 comprise multiple numerical scores for specific aspects of speech 100, rather than just an overall score. Fine-grained scores 140 helps a speaker assess their speech in granular detail by identifying specific areas for improvement.

Figure 2:
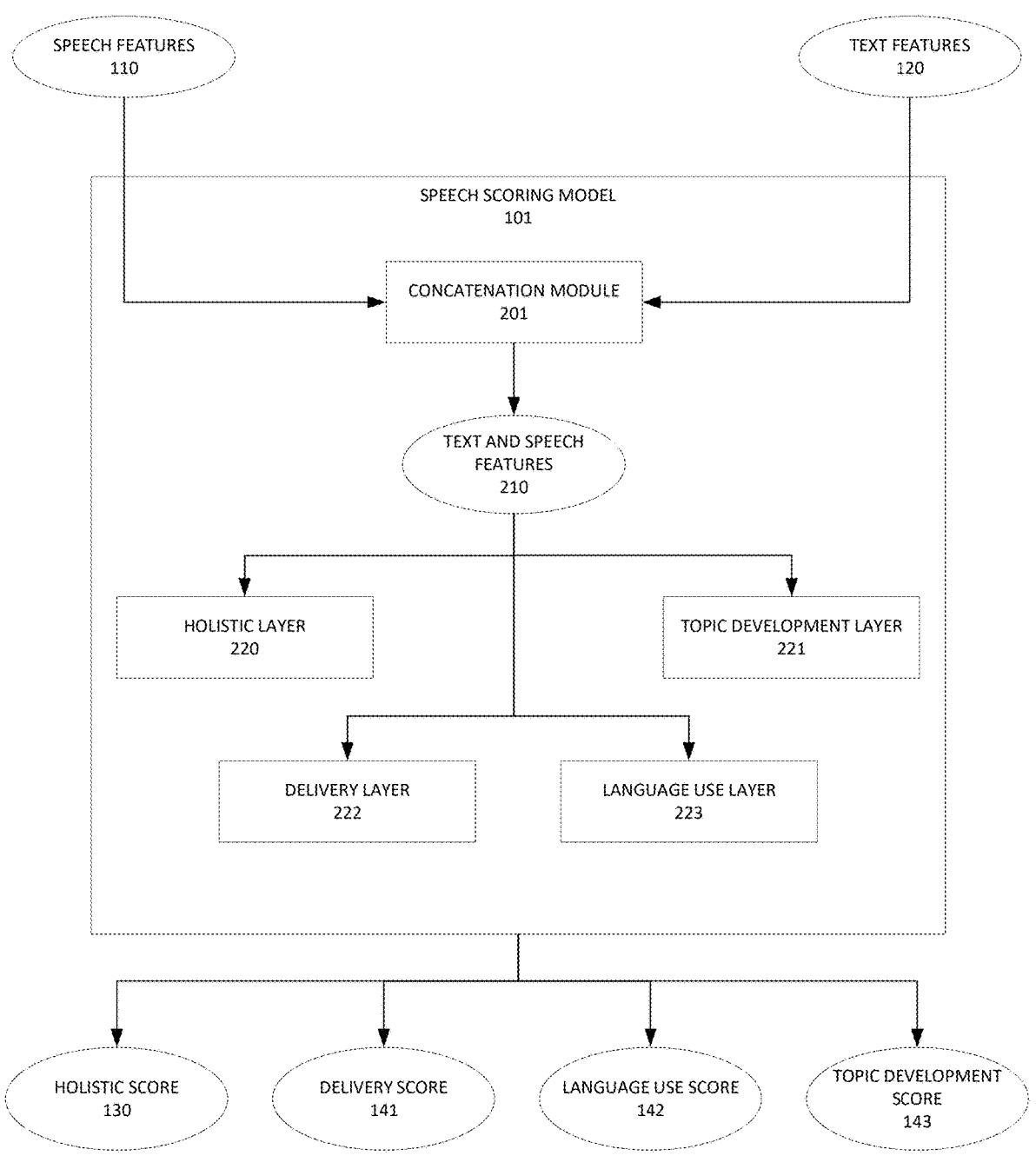
FIG. 2 illustrates further details of an exemplary speech scoring model that is configured to evaluate a speech in order to provide a holistic score, as well as a delivery score, a language use score, and a topic development score.

FIG. 2 illustrates further details of exemplary speech scoring model 101. In this embodiment, speech scoring model 101 is implemented on a bi-modal multi-task learning model that is configured to receive two types of input, speech features 110 and text features 120, and simultaneously provide multiple scores, holistic score 130, delivery score 141, language use score 142, and topic development score 143. As explained with respect to FIG. 1, holistic score 130 represents an evaluation of the entire speech. Delivery score 141 represents an evaluation of the presentation aspect of the speech. Delivery score 141 may take into consideration factors like speech fluency, pronunciation, and intonation. Language use score 142 measures the accuracy and effectiveness of the speaker's language use, encompassing factors like grammar, vocabulary, and sentence structure. Topic development score 143 represents how well the speaker has constructed their response to address the specific question or topic presented in the prompt. Topic development score 143 may take into consideration factors like relationship between ideas presented in the speech, and coherence and flow of the sentences used in the speech.

In FIG. 2, speech features 110 and text features 120, both of which are vector representations, are provided to concatenation module 201, that is configured to concatenate the two features and output the combined features, text and speech features 210, which is the combined vector representation. Text and speech features 210 is input into four different layers, that are each configured to simultaneously predict one of the four scores discussed above. In this exemplary embodiment, speech scoring model 101 is implemented on a neural network, where the four layers are regression layers that are configured to predict continuous values, meaning numerical values that fall within a certain range. In this example, the regression layers are specifically configured to predict numerical scores along a continuous scale for various aspects of speech 100, as represented by the four output scores. As explained in detail later with respect to FIG. 5, each regression layer has been trained so as to assign particular weights to particular features captured in the concatenated vector representation in order to output a particular score. Each regression layer takes text and speech features 210 as input, and applies a linear transformation to the corresponding vector representation, considering how much weight should be assigned to particular features. The result may be provided as a scalar value that reflects the score for a particular aspect of the speech, namely, holistic score 130, delivery score 141, language use score 142, and topic development score 143.

Figure 3:
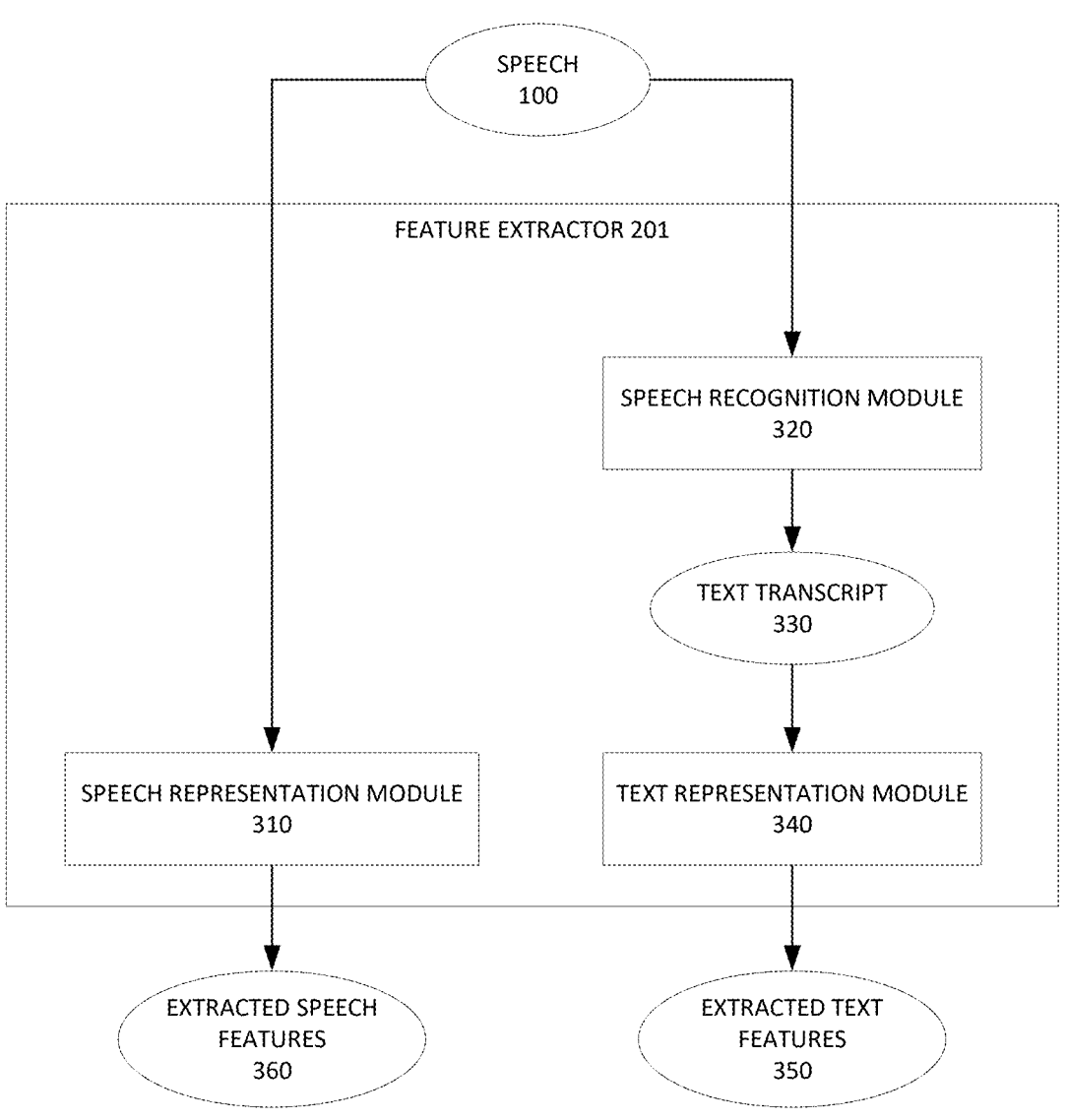
FIG. 3 illustrates further details of an exemplary feature extractor that is configured to extract both speech and text features from a speech.

FIG. 3 illustrates further details of exemplary feature extractor 201. Speech 100 is input into feature extractor 201, which simultaneously provides the speech to speech representation module 310 and speech recognition module 320. Speech recognition module 320 is configured to receive an audio recording and transcribe the recording to output a text transcript of the recording. Speech recognition module 320 transcribes speech 100 and outputs text transcript 330. Text transcript 330 represents not only the actual words spoken in speech 100, but also various other components present in speech 100. For example, in an embodiment, text transcript 330 may comprise hesitation markers, such as "uh," "umm," and "hmm" in addition to the actual spoken words. In another example, text transcript 330 may comprise repetitions when the speaker repeats a word, such as "I, I, I mean . . . ." In another example, text transcript 330 may comprise both word-level and phone-level features such as word duration, phone duration, pauses, and pronunciation. Combination of the actual spoken words and these various speech features results in a comprehensive transcription of speech 100 into text transcript 330.

Text transcript 330 is provided to text representation module 340 as input. In this embodiment, text representation module 340 is implemented on a bidirectional transformer model that is configured to capture the meanings of the words, phrases, and sentences used in text transcript 330, as well as the contextual relationships between the words, phrases, and sentences. Because the transformer is bidirectional, it can capture contextual information in both directions, meaning it can capture the contextual information for a word with respect to other words that are on the left, as well as with respect to other words that are on the right. In addition, text representation module 340 also captures the other speech components present in the text transcript as discussed above, such as hesitation markers and repetitions.

Initially, text transcript 330 is broken up into smaller tokens that may comprise letters, words, phrases, or sentences. A classification token is added at the beginning of the tokenized text transcript. Text representation module 340 transforms each token into a vector representation so that it can mathematically process text transcript 330.

Text representation module 340 comprises a plurality of layers, each of which processes the tokenized text transcript. As the vector representations of the tokens pass through the layers, the vectors are refined at each layer to capture more information about text transcript 330. Each layer refines the vector representations based on additional context and relationships within text transcript 330. In addition, the classification token added at the beginning is also continuously updated to reflect the additional information captured at each layer.

In this embodiment, context refers to how surrounding words, phrases, and sentences influence the meaning of other words, phrases, and sentences. For example, the word "right" could refer to the direction opposite of left, or to something that is correct as opposed to wrong. As the vector representation of the word "right" passes through the layers of text representation module 340, the vector representation is refined to reflect its actual meaning in the context of other words, phrases, and sentences surrounding that word in both directions. Similarly, relationships between words are also captured. For example, the sentence may be "The building is on the right." So the relationship between the words "building" and "right" are also captured in their respective vector representations.

As the vector representations for tokenized text transcript 330 passes through the layers, the vectors are refined to capture more nuanced meanings and relationships in the broader context of the entire text transcript. At the same time, the classification token is also refined to reflect this additional information about the text transcript. In the final layer, the classification token represents the entire text transcript. The classification token is extracted from the final layer to output extracted text features 350. Extracted text features 350 comprises a vector representation of text transcript 330, capturing the semantic and syntactic elements of the transcript as well as the contextual relationships.

In embodiments, in addition to encoding text transcript 330, text representation module 340 may also encode the prompt text for speech 100. The encoded prompt may be used as additional information when predicting the scores for the speech. In embodiments, text representation module 340 may be implemented on a pre-trained model like BERT$_{large}$. A pre-trained BERT$_{large}$ model is used to encode the prompt text, and a pre-trained $BERT_{large}$ model is used to encode the text transcript. The vector representations of the classification tokens of each BERT model is concatenated to output extracted text features 350, such that the extracted features capture not only the text transcript of the speech, but also the prompt to which the speech responds.

With respect to FIG. 3, speech 100 is also simultaneously provided to speech representation module 310, which is configured to transform a raw audio recording into extracted speech features 360. In this embodiment, speech representation module 310 is implemented on a pre-trained self-supervised transformer model. Unlike text representation module 340, which processes a corresponding text transcript to extract features from speech 100, speech representation module 310 directly processes speech 100 to extract its features.

Speech representation module 310 breaks up the raw audio recording into smaller segments. For example, these segments may be of 25 milliseconds in length. The speech signals in each segment are encoded into vector representations. The vector representations are further refined at each layer of speech representation module 310 to capture additional features like fluency, pronunciation, and acoustic features such as intonation, pauses, and duration of segments. These features capture the perceptual components of the speech, representing how the speech is perceived by a listener. As these vectors are processed through the layers, they are further refined to capture contextual information. At the final hidden layer, the vectors represent the entire input speech and its features. Global pooling is applied to the vectors at the final hidden layer to output extracted speech features 360. Global pooling essentially summarizes the vector representations at the final hidden layer to output a vector that represents the entire speech and its various perceptual features like fluency and pronunciation.

In embodiments, speech representation module 310 may be implemented on a pre-trained wav2vec 2.0 model to encode the input speech into vector representations. The audio signal of speech 100 is used as input, and global pooling is applied to the last hidden layer of the wav2vec 2.0 model to create a vector representation of speech 100, which corresponds to the classification token in a BERT model. Extracted speech features 360 is analogous to extracted text features 350.

In embodiments, speech representation module 310 may also capture semantic and syntactic information, such as relationships between the characters, words, phrases, and sentences used in speech 100, along with the perceptual and acoustic components of the speech. Similarly, text representation module 340 may also capture some perceptual components of the speech, along with the linguistic components because the text transcript input provided to text representation module 340 comprises disfluencies such as hesitation markers and repetitions. In embodiments, extracted speech features 360 and extracted text features 350 comprise some common perceptual and linguistic components extracted from the speech.

Figure 4:
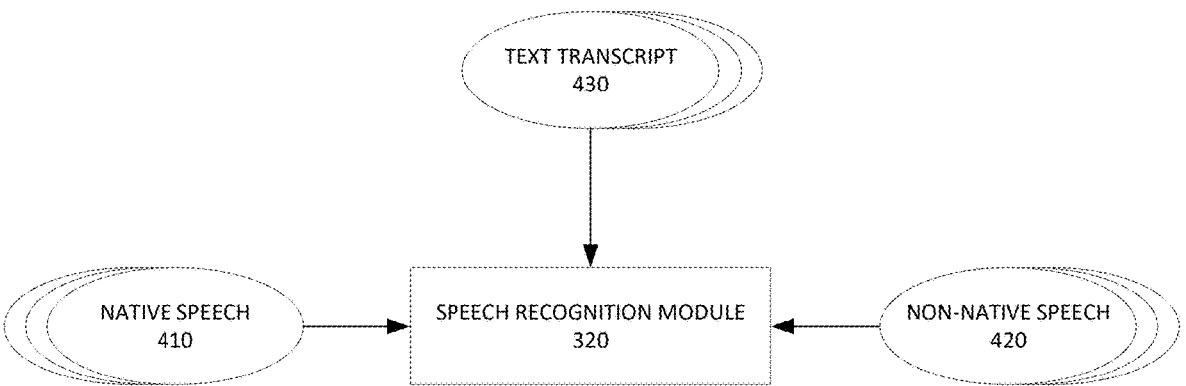
FIG. 4 illustrates an exemplary system for training a speech recognition module using both native and non-native speech.

FIG. 4 illustrates an exemplary system for training speech recognition module 320 using both native and non-native speech. To ensure a high level of accuracy, the module is provided with a plurality of native speech 410 as well as non-native speech 420. Native speech 410 refers to speech produced by native speakers of the language that the speech is in. Non-native speech 420 refers to speech produced by non-native speakers of the language that the speech is in. Non-native speech 420 may vary from native speech 410 in terms of acoustic cues, as well as the syntactic structure and word choices. Text transcript 430 comprises transcribed text for both input speeches. Speech recognition module 320 learns the mapping between the input speech and their corresponding transcribed text, minimizing differences between its predicted transcription and the input transcription. The transcription also includes other features mentioned with respect to FIG. 3, such as hesitation markers and pauses.

In an embodiment, speech recognition module 320 may be trained with 1600 hours of speech produced by both native and non-native speakers. The module may use Kaldi with modified nnet3-chain recipe, that is configured to produce content of the speech, informative word-level and phone-level features, hesitation markers, and repetitions.

Figure 5:
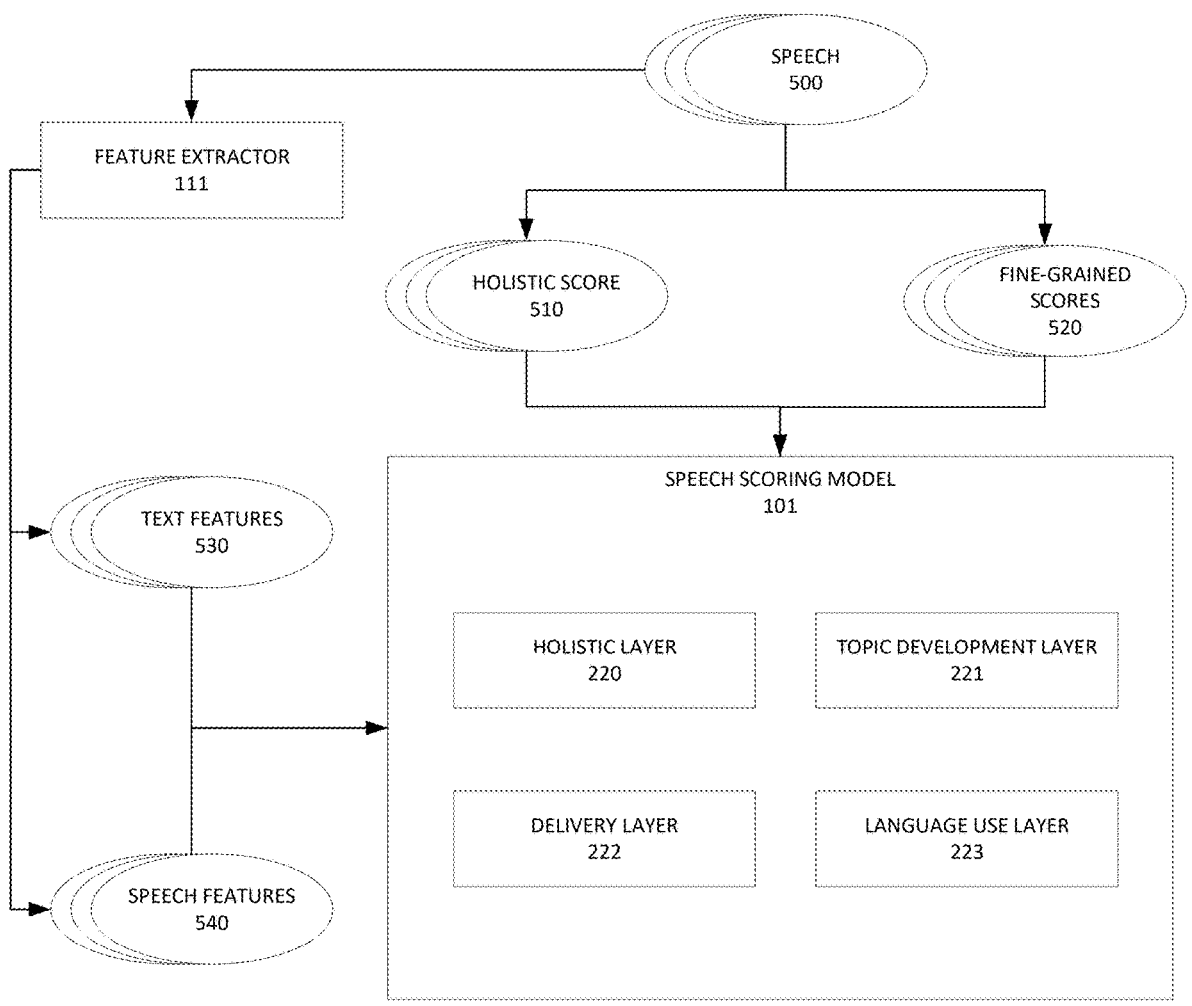
FIG. 5 illustrates an exemplary system for training a speech scoring module to evaluate a speech and simultaneously provide multiple scores.

FIG. 5 is an illustration of how exemplary speech scoring model 101 is trained. A plurality of speeches 500 is graded to assign a holistic score 510 as well as fine-grained scores 520 to each speech. In an embodiment, the speeches are graded by human graders. These scores are provided to speech scoring model 101. Text features 530 and speech features 540 are extracted from each of the plurality of speeches 500 via feature extractor 111. These features are also provided to speech scoring model 101. As explained with respect to FIG. 2, the two input features are concatenated into one vector representation that captures both the text features and the speech features.

The four regression layers in speech scoring model 101 are configured to predict specific scores for each speech. During the training process, the respective scores predicted by each regression layer is compared to the actual scores, holistic score 510 and fine-grained scores 520, provided to the model. Based on this comparison, speech scoring model 101 learns the optimal weights for each regression layer such that the differences between the provided scores and the corresponding predicted scores are minimized. For example, the weights for delivery layer 222 may be adjusted to assign greater value to features related to presentation of the speech such as speech fluency, pronunciation, and intonation. The weights for language use layer 223 may be adjusted to assign greater value to features such as grammar, vocabulary, and sentence structure. Therefore, even though the two layers receive the same concatenated vector representation of the speech to be graded, each layer focuses on specific features of the speech. Speech scoring model 101 iteratively adjusts the weights assigned to the features with respect to each regression layer as it processes more speeches, their extracted features, and corresponding scores provided by the graders.

FIG. 6 is an exemplary process flow diagram for automated fine-grained speech scoring. At 610, a speech in response to a prompt is accessed. The speech is provided to a speech recognition module at 620. The speech recognition module generates a text transcript of the speech at 630. At 640, speech features are extracted from the speech. Similarly, at 650, text features are extracted from the text transcript. Both speech features and text features are vector representations of the speech. At 660, the two features are concatenated into one vector representation that captures both perceptual and linguistic components of the speech. At 670, the concatenated vector is provided to a speech scoring model. The speech scoring model, at 680, simultaneously provides a holistic score as well as fine-grained scores to the speech based on the concatenated features.

Figures 7A, 7B:
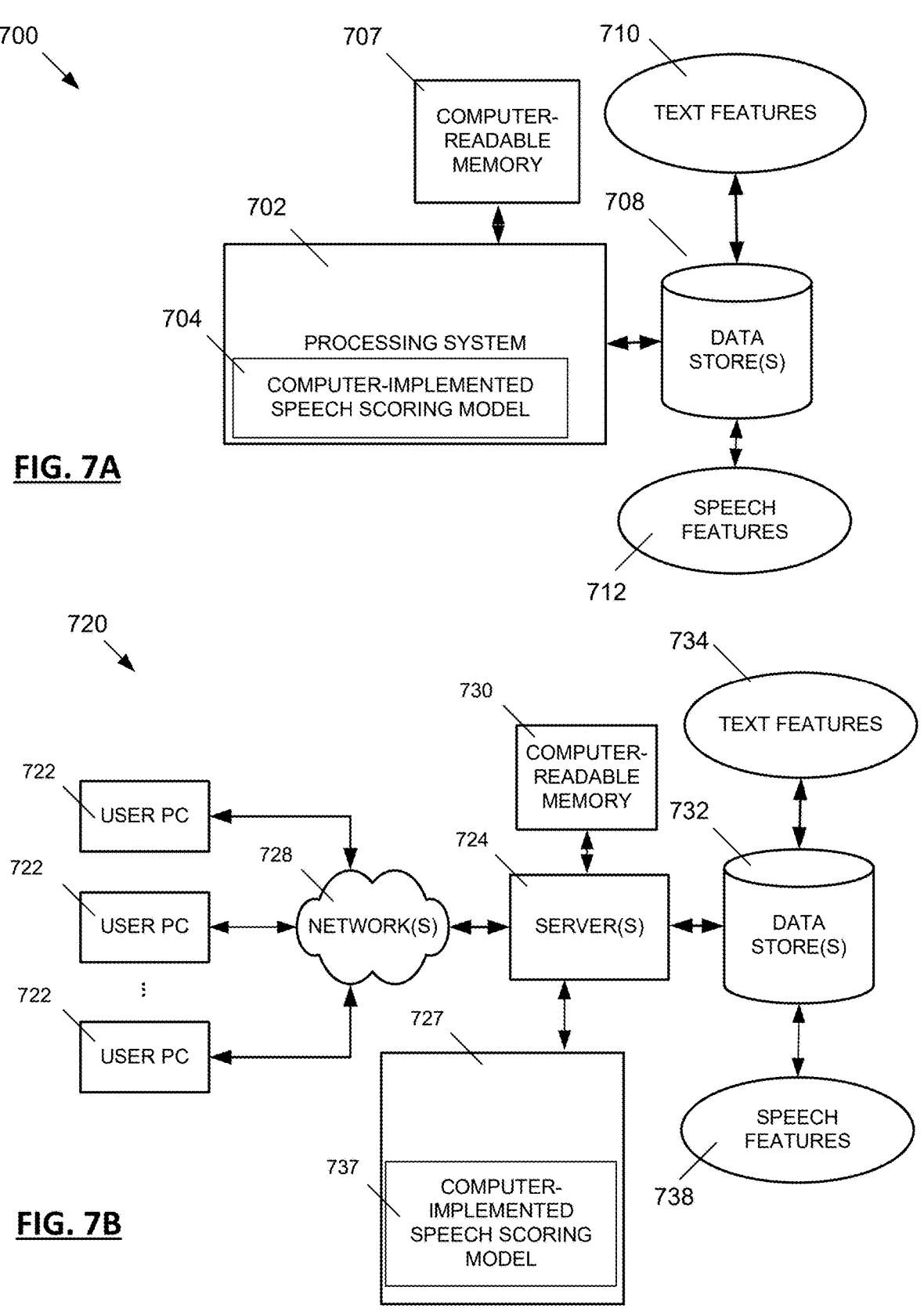
FIGS. 7A-7C depict example systems for implementing the approaches described herein for automated fine-grained speech scoring.
Figure 7C:
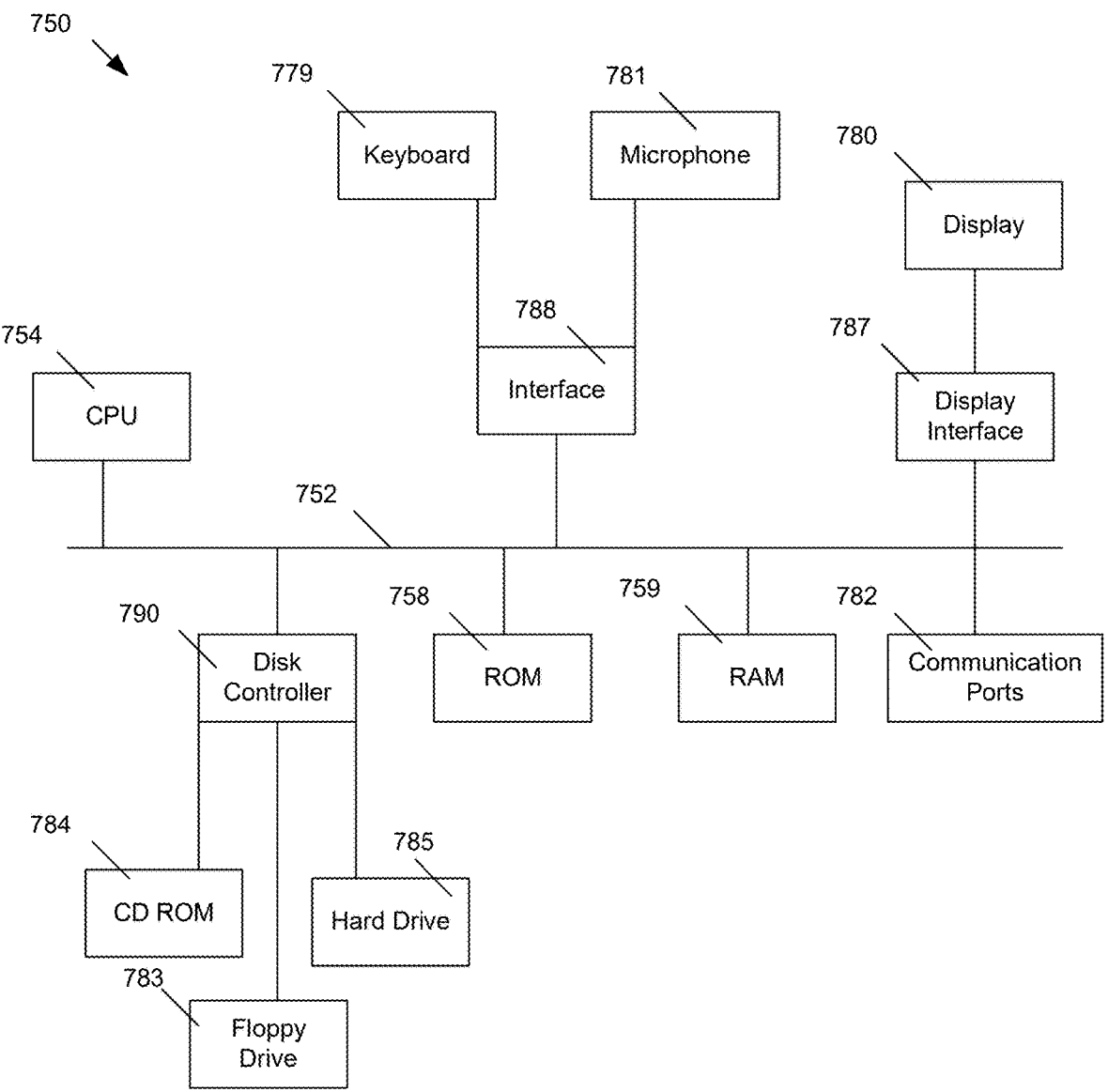

FIGS. 7A, 7B, and 7C depict example systems for implementing the approaches described herein for automated fine-grained speech scoring. For example, FIG. 7A depicts an exemplary system 700 that includes a standalone computer architecture where a processing system 702 (e.g., one or more computer processors located in a given computer or in multiple computers that may be separate and distinct from one another) includes a computer-implemented speech scoring model 704 being executed on the processing system 702. The processing system 702 has access to a computer-readable memory 707 in addition to one or more data stores 708. The one or more data stores 708 may include a text features database 710 as well as a speech features database 712. The processing system 702 may be a distributed parallel computing environment, which may be used to handle very large-scale data sets.

FIG. 7B depicts a system 720 that includes a client-server architecture. One or more user PCs 722 access one or more servers 724 running a computer-implemented speech scoring model 737 on a processing system 727 via one or more networks 728. The one or more servers 724 may access a computer-readable memory 730 as well as one or more data stores 732. The one or more data stores 732 may include a text features database 734 as well as a speech features database 938.

FIG. 7C shows a block diagram of exemplary hardware for a standalone computer architecture 750, such as the architecture depicted in FIG. 7A that may be used to include and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 758 and random access memory (RAM) 759, may be in communication with the processing system 754 and may include one or more programming instructions for performing the method of automated fine-grained speech scoring. Optionally, program instructions may be stored on a non-transitory computer-readable storage medium such as a magnetic disk, optical disk, recordable memory device, flash memory, or other physical storage medium.

In FIGS. 7A, 7B, and 7C, computer readable memories 707, 730, 758, 759 or data stores 708, 732, 783, 784, 788 may include one or more data structures for storing and associating various data used in the example systems for automated fine-grained speech scoring. For example, a data structure stored in any of the aforementioned locations may be used to store data from XML files, initial parameters, and/or data for other variables described herein. A disk controller 790 interfaces one or more optional disk drives to the system bus 752. These disk drives may be external or internal floppy disk drives such as 783, external or internal CD-ROM, CD-R, CD-RW or DVD drives such as 784, or external or internal hard drives 785. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 790, the ROM 758 and/or the RAM 759. The processor 754 may access one or more components as required.

A display interface 787 may permit information from the bus 752 to be displayed on a display 780 in audio, graphic, or alphanumeric format. Communication with external devices may optionally occur using various communication ports 782.

In addition to these computer-type components, the hardware may also include data input devices, such as a keyboard 779, or other input device 781, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method comprising:

accessing a speech in response to a prompt;

extracting, with a speech representation module that comprises a first transformer model, speech features from the speech as vector representations;

providing the speech to a speech recognition module;

generating, with the speech recognition module, a text transcript of the speech;

extracting, with a text representation module that comprises a second transformer model, text features from the text transcript as vector representations;

concatenating, with a concatenation module, the speech features and the text features into a combined vector representation; and simultaneously providing, with a speech scoring module, a holistic score and fine-grained scores as scalar values based on the concatenated features.

2. The computer implemented method of claim 1, wherein the fine-grained scores comprise delivery score, language use score, and topic development score.

3. The computer-implemented method of claim 1, wherein the speech representation module is implemented on a self-supervised transformer model.

4. The computer-implemented method of claim 3, wherein the speech features are extracted from the speech representation module by applying global pooling to a last hidden layer.

5. The computer-implemented method of claim 1, wherein the speech is transcribed into the text transcript, which comprises the speech's content, word-level and phone-level features, hesitation markers, and repetitions.

6. The computer-implemented method of claim 1, wherein the speech recognition module is trained on both native and non-native speech.

7. The computer-implemented method of claim 1, wherein the text representation module is implemented on a bidirectional transformer model.

8. The computer-implemented method of claim 7, wherein the text features are extracted from a final hidden layer of the text representation module.

9. The computer-implemented method of claim 7, wherein text of the prompt is provided to the text representation module.

10. The computer-implemented method of claim 9, wherein a vector representation of the prompt is extracted from the text representation module.

11. The computer implemented method of claim 10, wherein the vector representation of the prompt is concatenated with the text features.

12. The computer-implemented method of claim 1, wherein the speech scoring model comprises four regression layers.

13. The computer-implemented method of claim 12, wherein each regression layer predicts a specific score based on the concatenated features.

14. A system comprising:
one or more data processors; and
a computer-readable medium encoded with instructions for commanding the one or more data processors to execute steps of a process, the steps comprising:
accessing a speech in response to a prompt;
extracting, with a speech representation module that comprises a first transformer model, speech features from the speech;
providing the speech to a speech recognition module;
generating, with the speech recognition module, a text transcript of the speech;

extracting, with a text representation module that comprises a second transformer model, text features from the text transcript;
concatenating, with a concatenation module, the speech features and the text features; and
simultaneously providing, with a speech scoring module, a holistic score and fine-grained scores based on the concatenated features.

15. A computer-implemented method comprising:
accessing a speech in response to a prompt;
extracting speech features from the speech as vector representations;
generating a text transcript of the speech;
extracting text features from the text transcript as vector representations;
concatenating the speech features and the text features into a combined vector representation; and
simultaneously providing a holistic score and fine-grained scores as scalar values based on the concatenated features,
wherein the extracting steps and the scoring step are implemented by neural network language models.

16. The computer-implemented method of claim 1, wherein the holistic score comprises a singular numerical score that represents an evaluation of the entire speech, without providing insights into particular strengths and weaknesses of the speech, and
wherein the fine-grained scores comprise multiple numerical scores for specific aspects of speech.

17. The computer-implemented method of claim 12, wherein each regression layer is configured to predict numerical scores along a continuous scale for various aspects of speech by applying a linear transformation to the corresponding concatenated features and assigning weights to particular concatenated features.

18. The computer-implemented method of claim 7, wherein the bidirectional transformer model is configured to capture the meanings and contextual relationships of words, phrases, and sentences of the text transcript in both the forward and backward directions.

19. The computer-implemented method of claim 1, wherein the text transcript is tokenized into vector representations and passed through multiple layers of the text representation module to refine the vector representations based on additional context and textual relationships.

20. The computer-implemented method of claim 19, wherein a classification token is added at the beginning of the tokenized text transcript and continuously updated as the text transcript is passed through the layers of the text representation module to reflect the additional information captured at each layer.

21. The computer-implemented method of claim 1, wherein the speech scoring module comprises a bi-modal multi-task learning model.

* * * * *